US010800471B2

(12) United States Patent
Kirtland et al.

(10) Patent No.: US 10,800,471 B2
(45) Date of Patent: Oct. 13, 2020

(54) REMOVABLE SEAT FRAME FOR ENGINE INSTALLATION (71) Applicant: Honda Motor Co., Ltd., Tokyo (JP)

(72) Inventors: Dakota D Kirtland, Dublin, OH (US); Jason M Owens, Hilliard, OH (US); Dustin L Hinders, Lakeview, OH (US); Daniel T Sellars, West Liberty, OH (US); Travis Barkey, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 164 days.

(21) Appl. No.: 15/972,709

(22) Filed: May 7, 2018

(65) Prior Publication Data
US 2018/0251173 A1 Sep. 6, 2018

Related U.S. Application Data (63) Continuation of application No. 15/246,862, filed on Aug. 25, 2016, now Pat. No. 9,988,116.

(51) Int. Cl.
B62D 65/10 (2006.01)
B60K 5/12 (2006.01)
B60N 2/005 (2006.01)
B62D 25/08 (2006.01)
B62D 65/14 (2006.01)
B62D 21/18 (2006.01)
B60N 2/015 (2006.01)
B62D 65/02 (2006.01)
B60K 5/00 (2006.01)

(52) U.S. Cl.
CPC ............... B62D 65/10 (2013.01); B60K 5/12 (2013.01); B60N 2/005 (2013.01); B60N 2/015 (2013.01); B62D 21/183 (2013.01); B62D 25/082 (2013.01); B62D 65/14 (2013.01); B60K 2005/003 (2013.01); B60K 2005/006 (2013.01); B60Y 2200/20 (2013.01); B62D 65/026 (2013.01)

(58) Field of Classification Search
CPC .. B60K 5/12; B60K 2005/006; B62D 21/183; B62D 65/10; B62D 65/026; B62D 65/14; B62D 25/082; B60N 2/005
See application file for complete search history.

(56) References Cited

U.S. PATENT DOCUMENTS

| 980,603 A | 1/1911 | Clarke |
| 6,626,260 B2 | 9/2003 | Gagnon et al. |
| 7,677,343 B2 | 3/2010 | Kitai et al. |

(Continued)

Primary Examiner — Drew J Brown
(74) Attorney, Agent, or Firm — American Honda Motor Co., Inc.; Mark E. Duell (57) ABSTRACT A motor vehicle includes a frame body defining a cabin area and an engine area. The engine area is primarily accessible from the cabin area during installation of the engine assembly. A seat frame is removably attached to the frame body in the cabin area, and a seat assembly is removably attached to the seat frame. A method of installing the engine assembly during the assembly of the motor vehicle includes the steps of lowering the engine assembly into the cabin area of the frame body, moving the engine assembly along a longitudinal axis into the engine area of the frame body, lowering the engine assembly onto an engine mount in the engine area of the frame body, attaching the seat frame to the frame body in the cabin area, and attaching the seat assembly to the seat frame.

18 Claims, 10 Drawing Sheets (56) References Cited

U.S. PATENT DOCUMENTS

| | | |
|---|---|---|
| 7,717,495 B2 | 5/2010 | Leonard et al. |
| 8,215,694 B2 | 7/2012 | Smith et al. |
| 8,382,125 B2 | 2/2013 | Sunsdahl et al. |
| 8,499,882 B2 | 8/2013 | Tsumiyama et al. |
| 8,662,239 B2 | 3/2014 | Takagi |
| 8,960,754 B1 | 2/2015 | Maeda et al. |
| 9,266,417 B2 | 2/2016 | Nadeau et al. |
| 9,327,587 B2 | 5/2016 | Spindler et al. |
| 2004/0195885 A1 | 10/2004 | Simpson |
| 2011/0012334 A1 | 1/2011 | Malberg |
| 2014/0090918 A1 | 4/2014 | Sunsdahl et al. |
| 2015/0259011 A1 | 9/2015 | Deckard et al. |
| 2015/0329148 A1 | 11/2015 | Borowicz et al. |
| 2016/0176283 A1 | 6/2016 | Hickie et al. |
| 2016/0176316 A1 | 6/2016 | Kosuge et al. |
| 2017/0174027 A1 | 6/2017 | Mailhot et al. |

# REMOVABLE SEAT FRAME FOR ENGINE INSTALLATION

RELATED APPLICATION

This application is a continuation of prior U.S. patent application Ser. No. 15/246,862 filed on Aug. 25, 2016, the content of which is incorporated by reference herein in its entirety.

TECHNICAL FIELD

The embodiments described herein relate to the field of frames for motor vehicles, particularly side-by-side sport utility vehicles.

BACKGROUND

In the class of motor vehicles described as side-by-side utility vehicles, the engine assemblies are often located behind the front-row seats and under the cargo area of the motor vehicle. Due to the structural requirements of the vehicle frame, there is a need for a method for installing the engine assembly during the assembly process of the vehicle.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a frame for a motor vehicle having an engine assembly includes a frame body defining a cabin area and an engine area, the engine area being primarily accessible from the cabin area during installation of the engine assembly, a seat frame removably attached to the frame body in the cabin area, and a seat assembly removably attached to the seat frame.

According to another aspect, a method of installing an engine assembly in a motor vehicle is disclosed. The motor vehicle includes a frame body defining a cabin area and an engine area, the engine area being primarily accessible from the cabin area during installation of the engine assembly, a seat frame removably attached to the frame body in the cabin area, and a seat assembly removably attached to the seat frame. The method includes the steps of lowering the engine assembly into the cabin area of the frame body, moving the engine assembly along a longitudinal axis into the engine area of the frame body, lowering the engine assembly onto an engine mount in the engine area of the frame body, attaching the seat frame to the frame body in the cabin area, and attaching the seat assembly to the seat frame.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
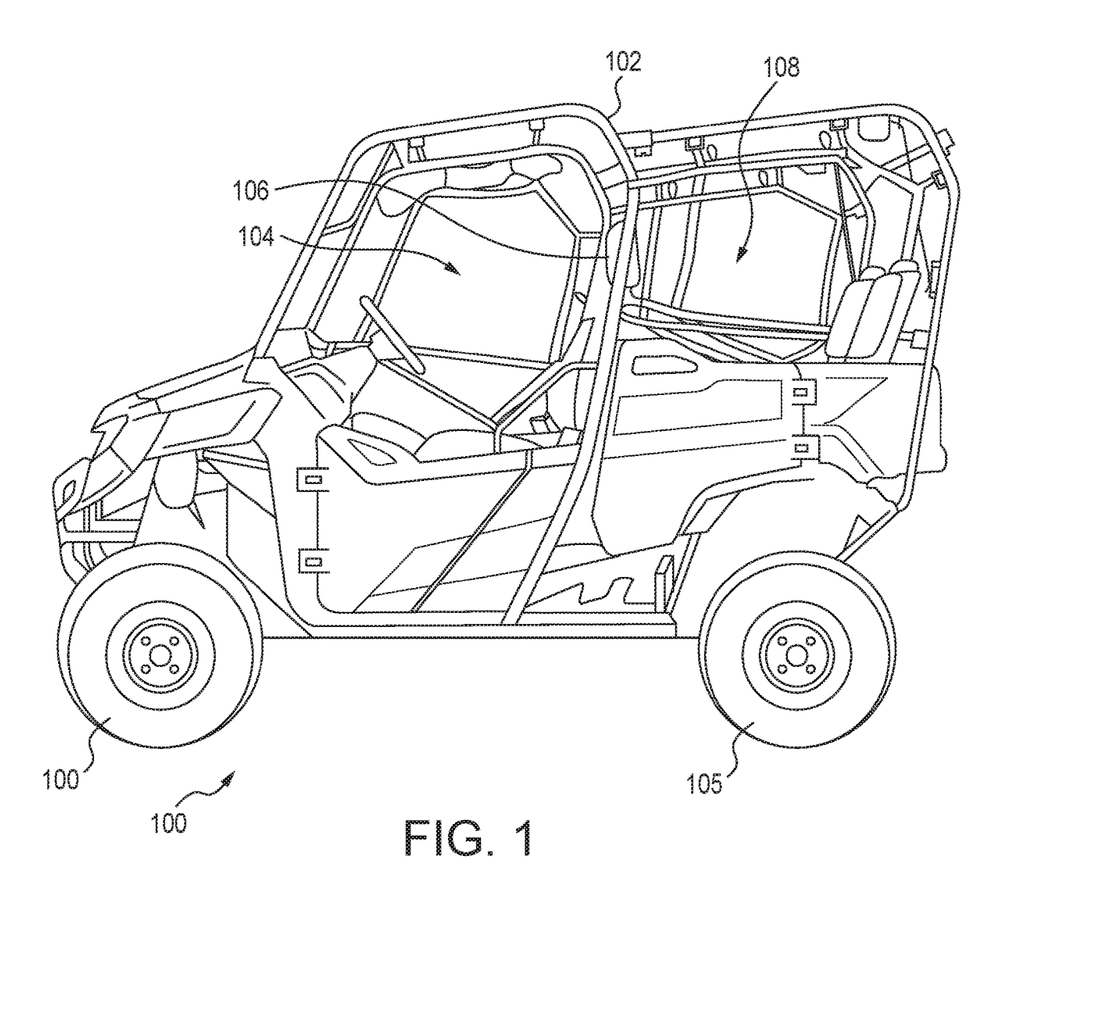
FIG. 1 is a side view of a motor vehicle.

FIG. 1 illustrates one embodiment of a motor vehicle 100. The motor vehicle 100 illustrated is a typical side-by-side utility vehicle, which includes a frame 102, wheels 105 attached to the frame 102, a cabin area 104 in the frame 102, which includes seats 106, an engine area 200 shown in the cut-away illustrated in FIG. 2, and engine assembly 202 attached to the frame 102 for driving the wheels 105, and a rear cargo area 108 above the engine area 200, which may include rear seats 110.

Figure 2:
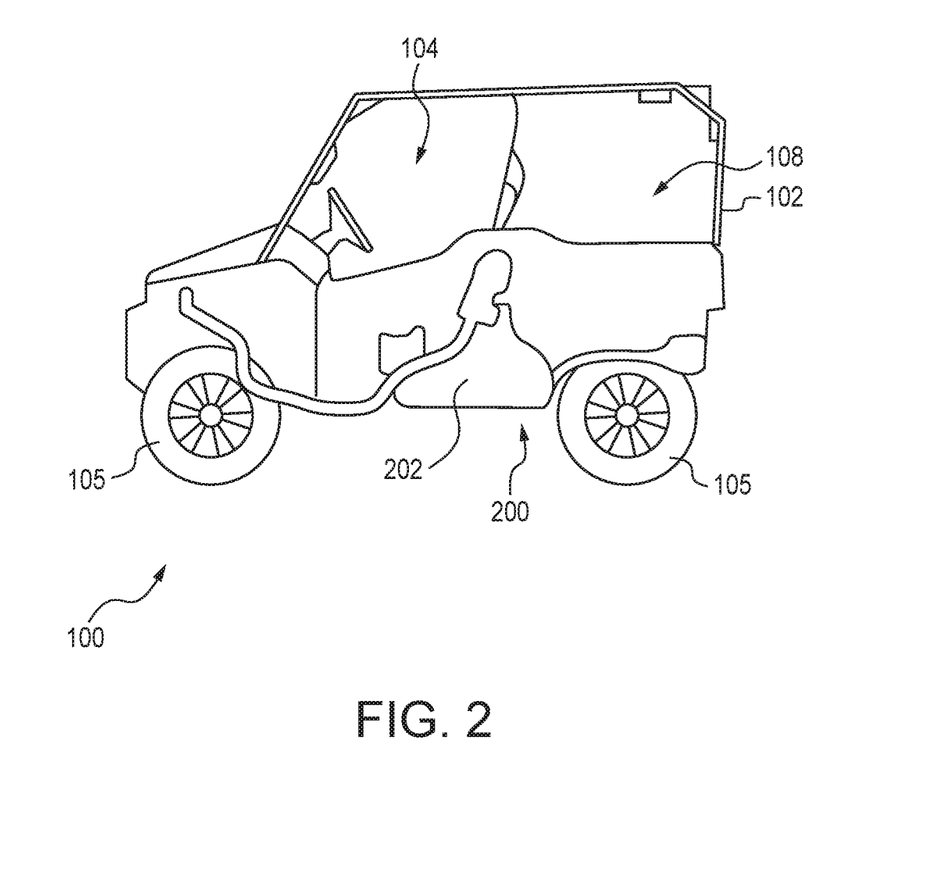
FIG. 2 is a cut away side view of the motor vehicle of FIG. 1.

As illustrated in FIG. 2, the engine assembly 202 of the motor vehicle 100 sits in an engine area 200 that is rearward of the cabin area 104 and beneath the cargo area 108 of the motor vehicle. Due to the placement of the engine assembly 202 in the engine area 200, a need for method of installing the engine assembly 202 in the manufacturing process was identified.

Figure 3:
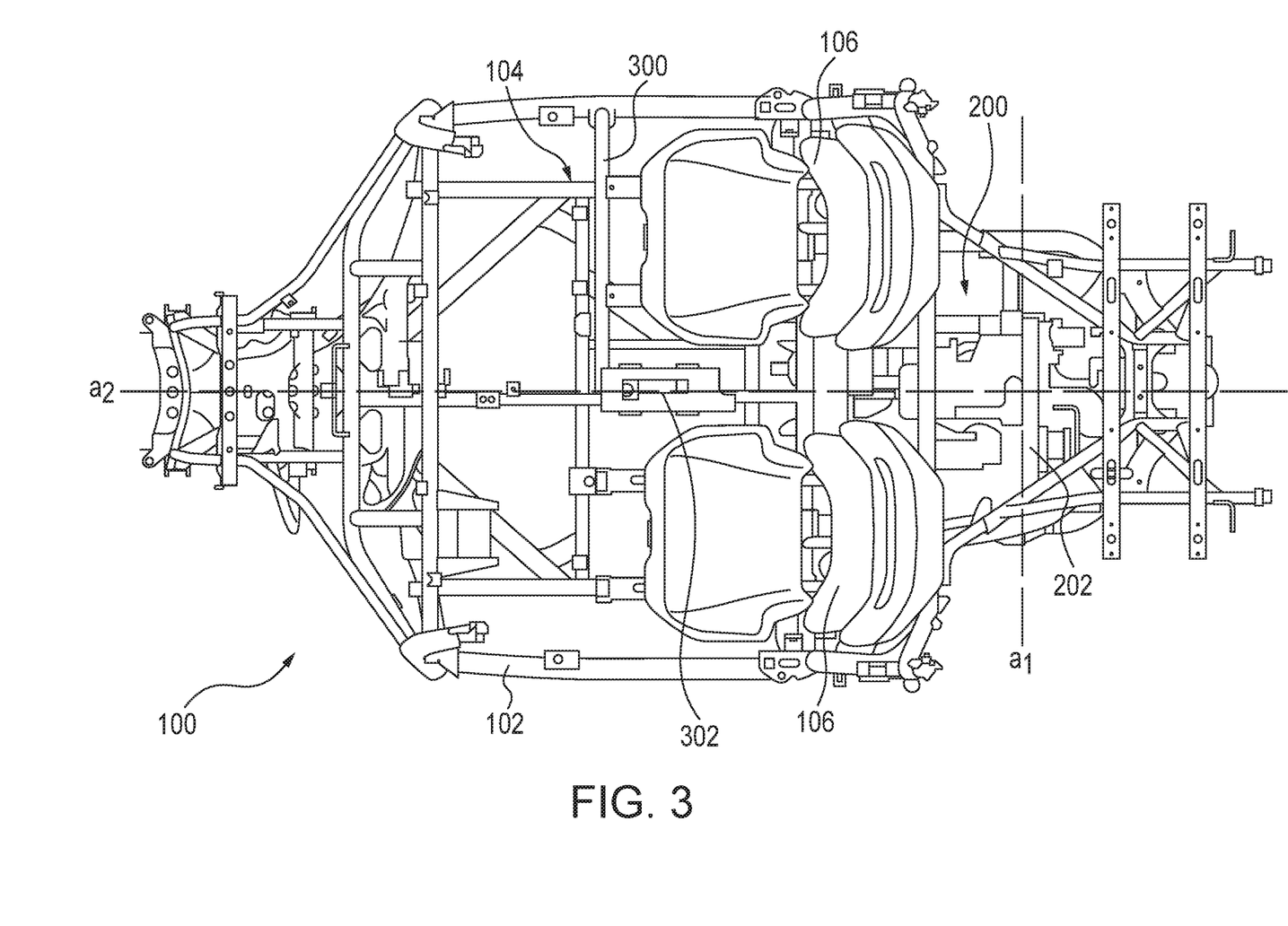
FIG. 3 is a top view of the frame of the motor vehicle of FIG. 1.
Figure 4:
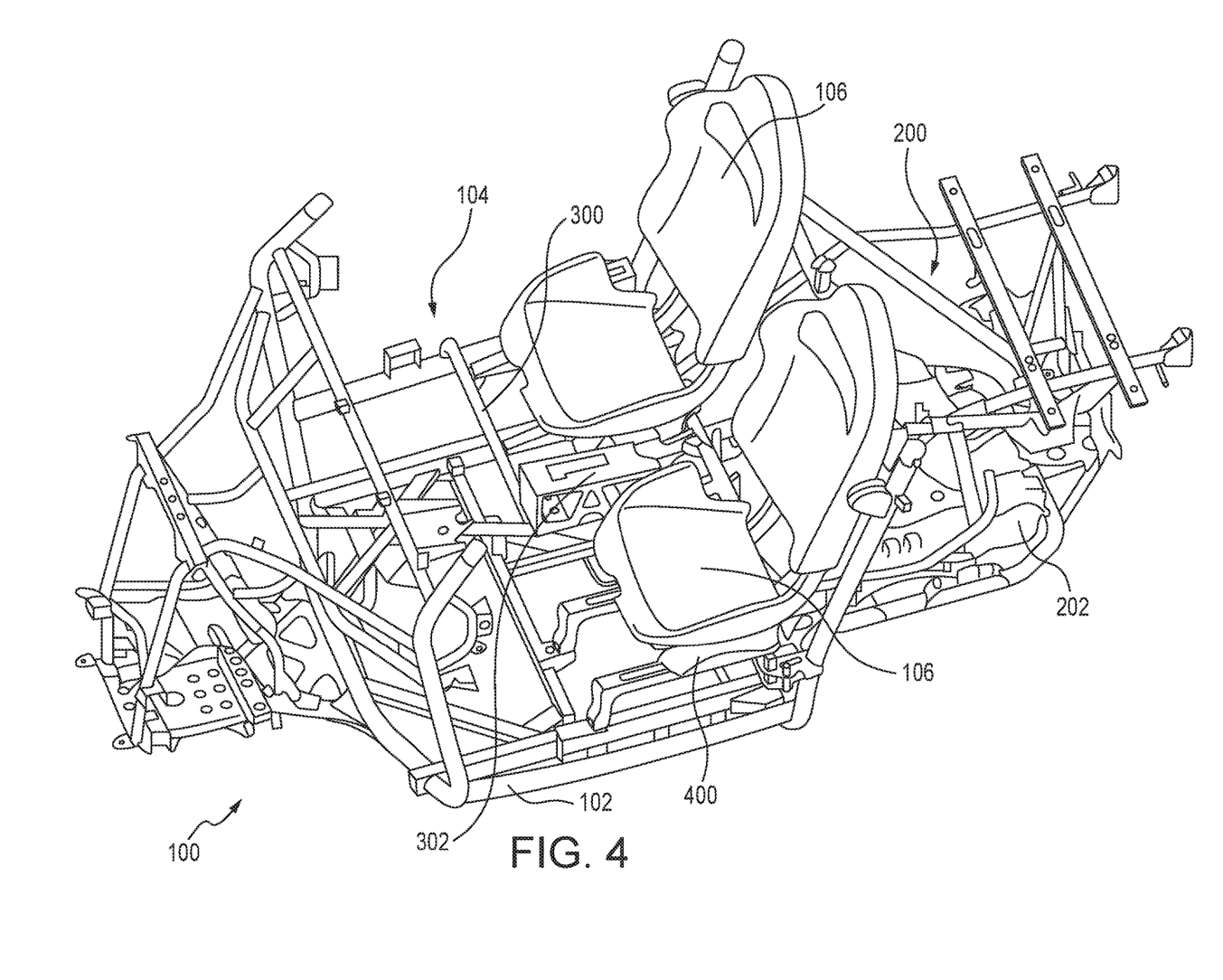
FIG. 4 is a perspective view of the frame of the motor vehicle of FIG. 1.
Figure 5:
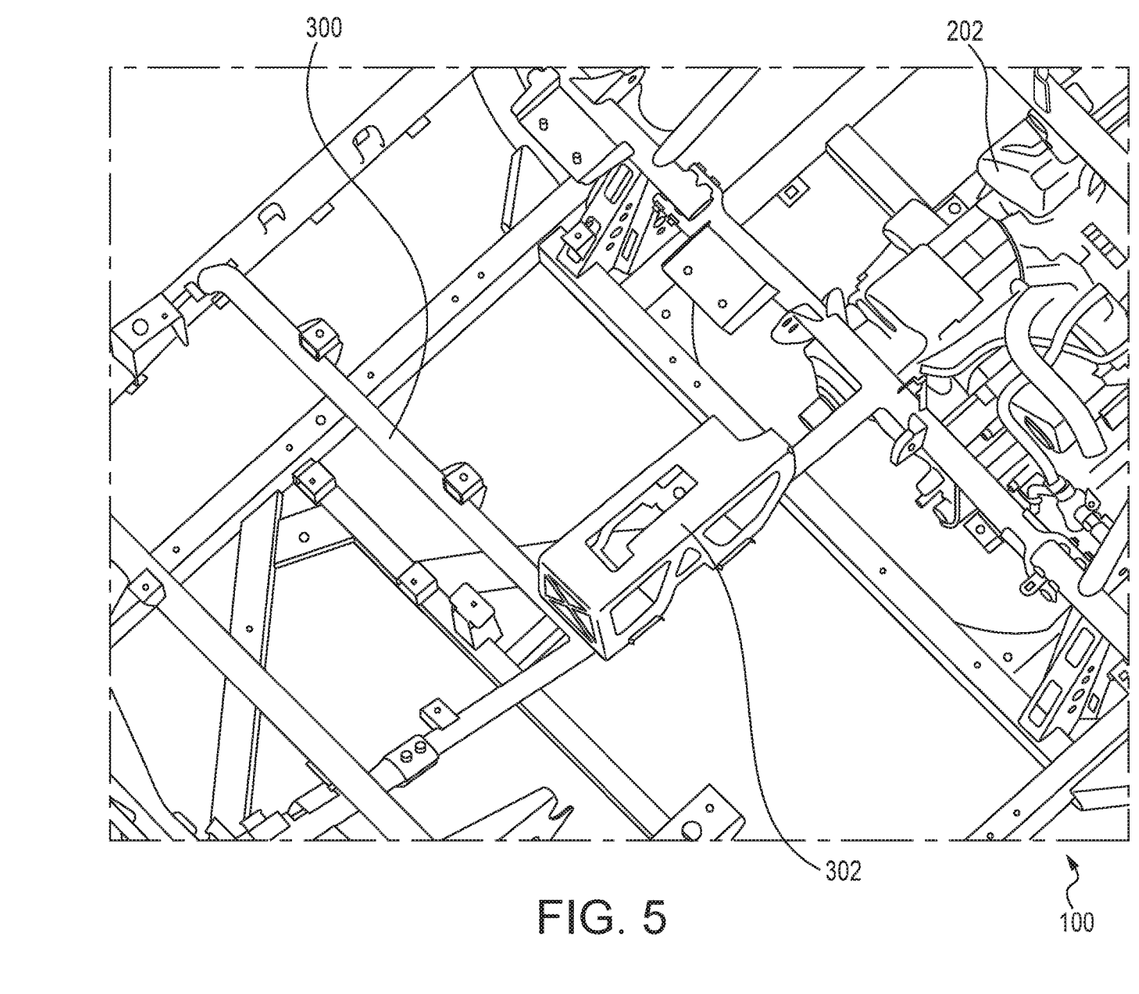
FIG. 5 is a close up side perspective of a seat frame illustrated in FIG. 3.

FIGS. 3-4 show top and perspective views of the frame 102 and engine assembly 202 of the motor vehicle 100. The frame 102 defines the cabin area 104, in which the motor vehicle 100 operator and passenger sits, and the engine area 200 of the motor vehicle 100. As illustrated in FIGS. 3-4, the engine area 200, which is where the engine assembly 202 is installed, is longitudinally rearward of the cabin area 104.

As illustrated in FIGS. 3-6, within the cabin area 104 there is located a seat frame 300 which is removably attached to the frame 102. The seat frame 300 may also include a shift selector and electrical harness 302 positioned between the seats 106 in a two (2) seat configuration. The seat frame 300 is preferably a single-piece weldment, although accessory parts, such as the shift selector and electrical harness 302 may be welded or removably attached to the seat frame 300. The seat frame 300 is attached by nut and bolt assemblies or any other suitable removable connector known to those skilled in the art.

Figure 6:
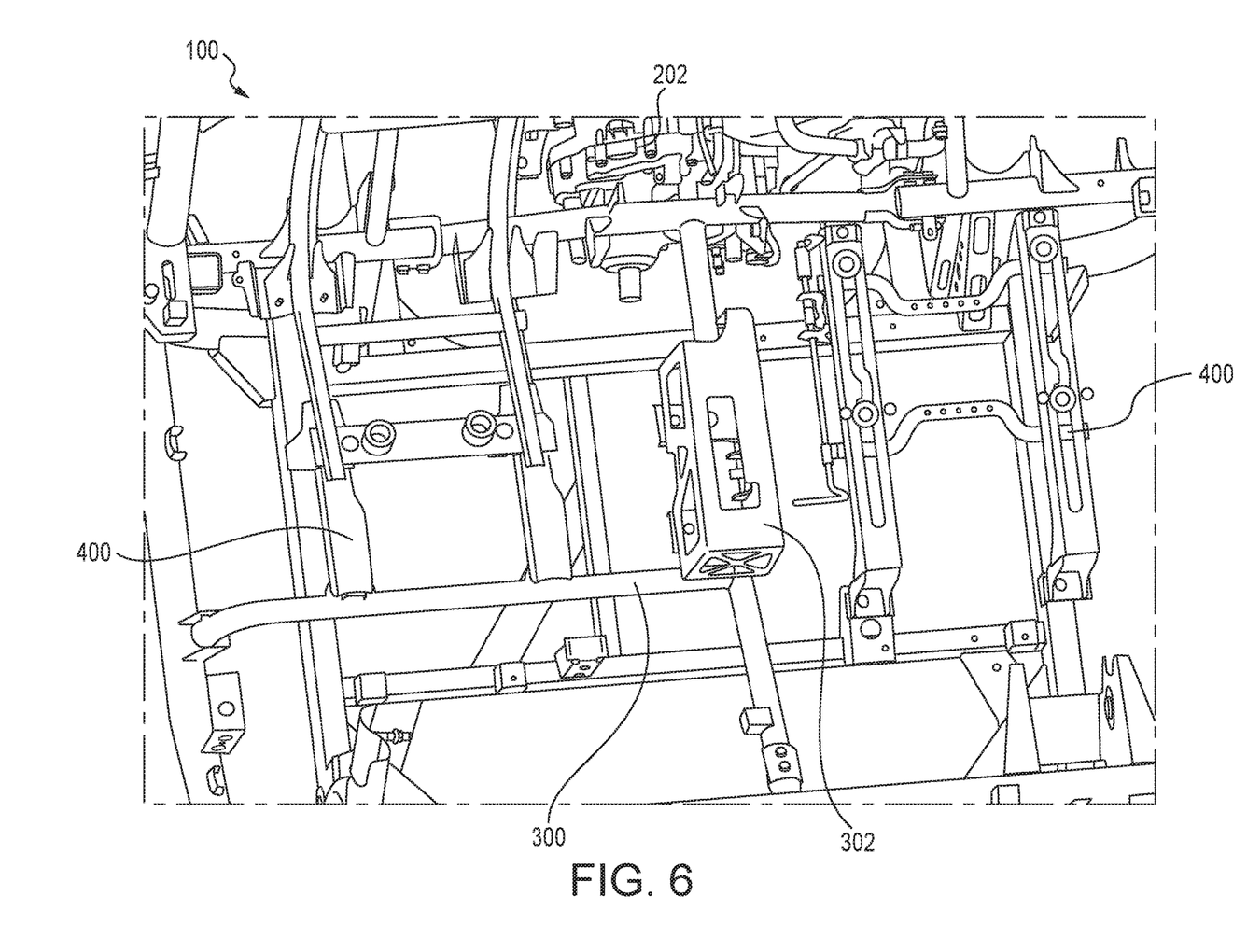
FIG. 6 is a close up top perspective of the seat frame and seat assemblies illustrated in FIG. 3.

As illustrated in FIGS. 4, and 6, seat assemblies 400 are removably attached to the seat frame 300 and frame 102. The seat assemblies 400 are preferably attached by nut and bolt assemblies or any other suitable removable connector known to those skilled in the art.

On top of the seat assemblies 400 are the seats 106 of the motor vehicle 100. In the embodiment illustrated in FIGS. 3-6, two seats 106 are provided that are placed side-by-side, with the shift selector and electrical harness 302 located between the two seats 106. In an alternate embodiment, a single bench-style seat (not illustrated) capable of holding two passengers may be attached to the seat assemblies 400.

With reference to FIGS. 7-10, a method of assembling the motor vehicle 100 is described. Prior to installing the seat assemblies 400 and seat frame 300, the engine assembly 202, which includes the engine 700, transmission 702, and associated parts known to one skilled in the art, is installed. The frame 102 includes a B-pillar opening 704 between the engine area 200 and the cabin area 104. Additionally, due to the seat frame 300 and seat assemblies not being installed on the frame 102, the cabin area 104 is also open.

Figure 7:
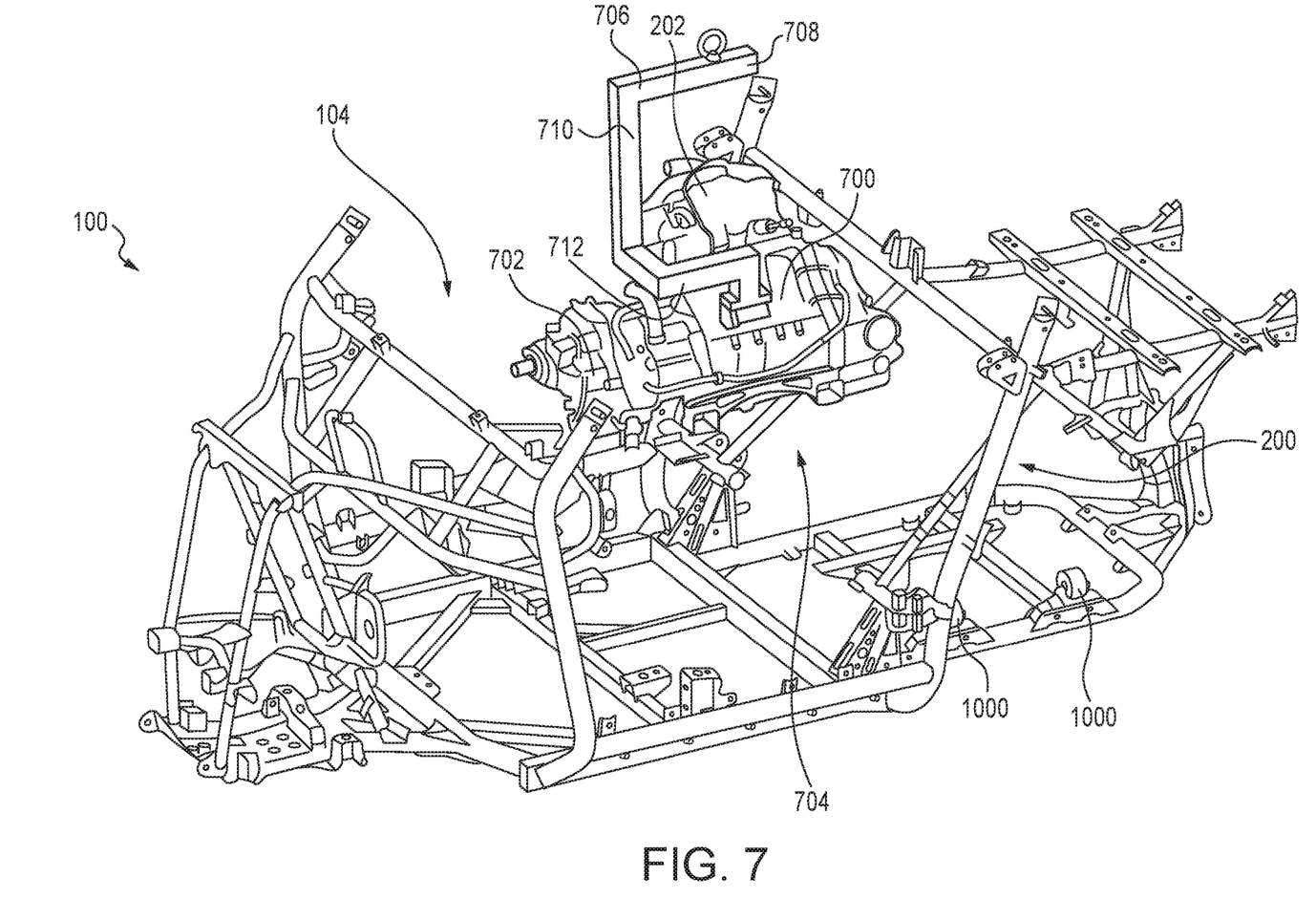
FIG. 7 is a perspective view of a first step of the installation of an engine assembly of the vehicle illustrated in FIG. 1.

As illustrated in FIG. 7, the first step of assembly is to lower the engine assembly 202 on an installation jig 706 into the cabin area 104. As shown, in the embodiment illustrated in the FIGS. 7-10, the installation jig 706 is a generally C-shaped with an upper horizontal arm 708, and central support 710, and a lower horizontal arm 712. The upper horizontal arm 708 is supported on a manufacturing line (not shown), and the engine assembly 202 is removably attached to the lower horizontal arm 712.

Figure 8:
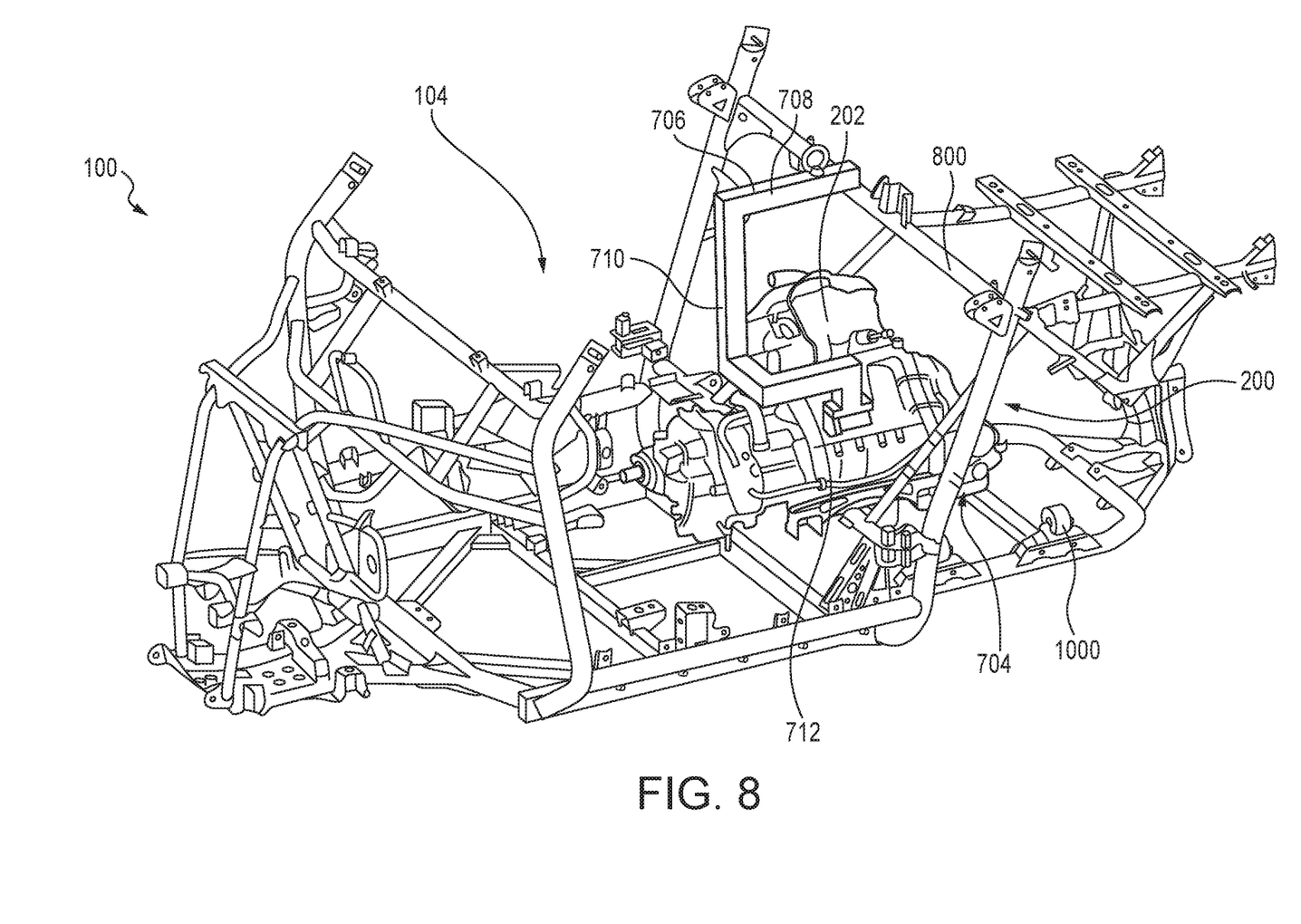
FIG. 8 is a perspective view of a second step of the installation of the engine assembly of the vehicle illustrated in FIG. 1.

As illustrated in FIG. 8, the second step of assembly is to begin to move the engine assembly 202 and jig 706 longitudinally rearward through the B-pillar opening 704 between the cabin area 104 and engine area 202. The shape of the jig 706 allows the jig 706 to avoid contact with the upper crossbar 800 in the frame 102 that defines the top of the B-pillar opening 704.

Figure 9:
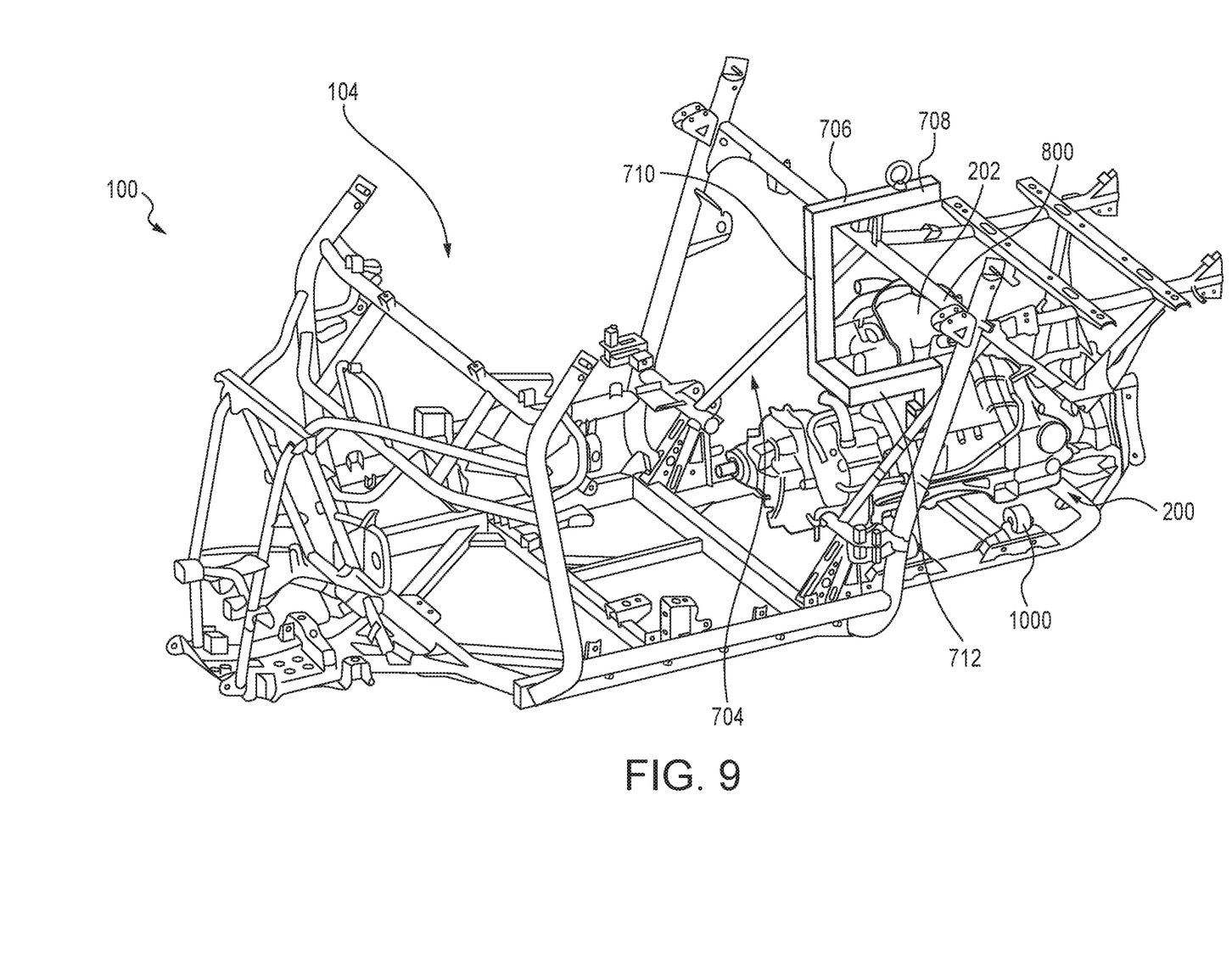
FIG. 9 is a perspective view of a third step of the installation of the engine assembly of the vehicle illustrated in FIG. 1.

As illustrated in FIG. 9, the engine assembly 202 is moved into the engine area 200, with further rearward movement prevented by interference of rearward movement of the central support 710 of the jig 706 by the crossbar 800.

Figure 10:
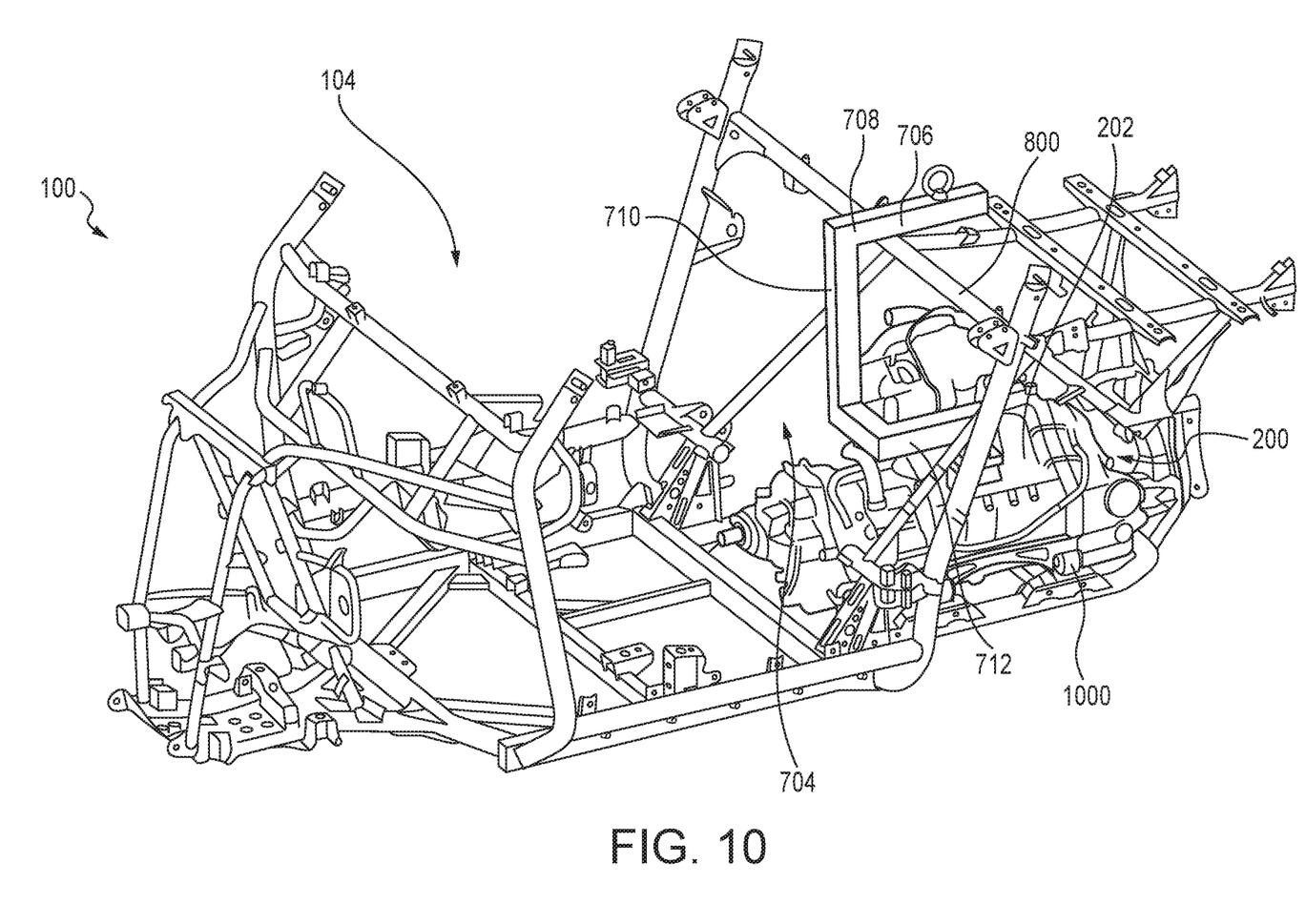
FIG. 10 is a perspective view of a final step of the installation of an engine assembly of the vehicle illustrated in FIG. 1.

The final installation of the engine assembly 202 is illustrated in FIG. 10. The engine assembly 202 and jig 706 may be moved laterally along a lateral axis $a_1$ to place the engine assembly 202 on top of engine mounts 1000. In the embodiment illustrated, the engine mounts 1000 are located on the frame 104 such that the engine assembly 202 is centered left of a longitudinal axis $a_2$ as illustrated in FIG. 3. Once the engine assembly 202 is laterally positioned above the engine mounts 1000, the engine assembly 202 is lowered onto the engine mounts 1000, attached to the engine mounts in a manner known to one skilled in the art, and the jig 706 is disconnected. Finally, the jig 706 is moved longitudinally forward out of the engine area 200 into the cabin area 104, and then removed upwardly out of the cabin area.

Upon completion of the installation of the engine assembly 202, the seat frame 300, seat assemblies 400, and seats 106 may be installed as described above.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A frame for a motor vehicle having an engine assembly, comprising:
    a frame body defining a cabin area and an engine area, the engine area being longitudinally rearward of the cabin area and primarily accessible from the cabin area during installation of the engine assembly;
    a seat frame removably attached to the frame body in the cabin area;
    a seat assembly removably attached to the seat frame and wherein the seat assembly is also separately and removably attached to the frame body in addition to the seat frame; and
    wherein the seat assembly and seat frame are removed to access the engine area.

2. The frame of claim 1 wherein the seat frame is removably attached to the frame body by nut and bolt fasteners.

3. The frame of claim 2 wherein the seat assembly is removably attached to the seat frame by nut and bolt fasteners.

4. The frame of claim 3 wherein the seat assembly comprises:
    a driver seat removably attached to the seat frame; and
    a passenger seat removably attached to the seat frame.

5. The frame of claim 3 wherein the seat assembly comprises:
    a bench seat for accommodating multiple passengers, the bench seat removably attached to the seat frame.

6. The frame of claim 1 wherein the seat frame is removably attached to the frame body by nut and bolt fasteners.

7. The frame of claim 6 wherein the seat assembly is removably attached to the seat frame and to the frame body by nut and bolt fasteners.

8. The frame of claim 7 wherein the seat assembly comprises:
    a driver seat removably and separately attached to both the seat frame and to the frame body; and
    a passenger seat removably and separately attached to both the seat frame and to the frame body.

9. The frame of claim 8 further comprising:
    a shift selector fixedly attached to the seat frame between the driver seat and the passenger seat.

10. A frame for a motor vehicle having an engine assembly, comprising:
    a frame body defining a cabin area and an engine area, the engine area being located longitudinally rearward of the cabin area and primarily accessible from the cabin area;
    a seat frame removably attached to the frame body in the cabin area;
    a driver seat removably and separately attached to both the seat frame and to the frame body;
    a passenger seat removably and separately attached to both the seat frame and to the frame body; and
    wherein the seat frame, the driver seat, and the passenger seat are removed to access the engine area.

11. The frame of claim 10 further comprising:
    a shift selector fixedly attached to the seat frame between the driver seat and the passenger seat.

12. The frame of claim 11 further comprising:
an electrical harness integrally connected to the shift selector.

13. The frame of claim 12 wherein the seat frame is removably attached to the frame body by nut and bolt fasteners.

14. The frame of claim 13 wherein the driver seat and passenger seat are removably attached to the seat frame and to the frame body by nut and bolt fasteners.

15. The frame of claim 14 wherein the shift selector is welded to the seat frame.

16. A frame for a motor vehicle having an engine assembly, comprising:
a frame body defining a cabin area and an engine area for receiving the engine assembly, the engine area being separated from the cabin area by a B-pillar, the engine area being located longitudinally rearward of the cabin area;
a seat frame removably attached to the frame body in the cabin area;
a seat assembly separately and removably attached to the frame body and to the seat frame; and
wherein the engine area is accessible from the cabin area through an opening defined by the B-pillar when the seat frame and the seat assembly are removed.

17. The frame of claim 16 the seat assembly comprises:
a driver seat removably and separately attached to both the seat frame and to the frame body; and
a passenger seat removably and separately attached to both the seat frame and to the frame body.

18. The frame of claim 17 further comprising:
a shift selector fixedly attached to the seat frame between the driver seat and the passenger seat; and
an electrical harness integrally connected to the shift selector.

* * * * *